(12) United States Patent  
Lewis et al.

(10) Patent No.: US 7,219,440 B2  
(45) Date of Patent: May 22, 2007

(54) LAY-OUT TOOL AND ASSEMBLY

(76) Inventors: Steven W. Lewis, 120 Washington St., Woodbury, CT (US) 06798; Robert L. Brass, 45 Calhoun St., Washington, CT (US) 06794

( * ) Notice: Subject to any disclaimer, the term of this patent is extended or adjusted under 35 U.S.C. 154(b) by 0 days.

(21) Appl. No.: 11/072,652

(22) Filed: Mar. 1, 2005

(65) Prior Publication Data

US 2006/0196072 A1 Sep. 7, 2006

(51) Int. Cl.
B43L 7/027 (2006.01)
G01B 3/10 (2006.01)

(52) U.S. Cl. ............................. 33/760; 33/427; 33/770

(58) Field of Classification Search .................. 33/760, 33/484, 427, 429, 562, 770, 628, 630, 755, 33/640
See application file for complete search history.

(56) References Cited

U.S. PATENT DOCUMENTS

| | | | | | |
|---|---|---|---|---|---|
| 4,429,466 | A | * | 2/1984 | Leonard | 33/613 |
| 4,642,898 | A | * | 2/1987 | Miller | 33/761 |
| 4,700,489 | A | * | 10/1987 | Vasile | 33/342 |
| 5,040,256 | A | * | 8/1991 | Mills | 33/760 |
| 5,406,711 | A | * | 4/1995 | Graham | 33/760 |
| 5,481,810 | A | * | 1/1996 | Hastings et al. | 33/484 |
| 5,787,599 | A | * | 8/1998 | Clifton | 33/760 |
| 5,848,481 | A | * | 12/1998 | Parsons et al. | 33/760 |
| 6,226,885 | B1 | * | 5/2001 | Korich | 33/760 |
| 6,725,556 | B1 | * | 4/2004 | Graham | 33/429 |
| 7,020,978 | B1 | * | 4/2006 | Nelson | 33/760 |
| 2004/0172846 | A1 | * | 9/2004 | McRae | 33/760 |

* cited by examiner

*Primary Examiner*—Yaritza Guadalupe-McCall  
(74) *Attorney, Agent, or Firm*—Ira S. Dorman

(57) ABSTRACT

A lay-out tool assembly includes a square having a base component with a straight edge and with trough structure in which a carpenter's pencil is seated, an abrasive area for sharpening the pencil, and wall structure on which a tape measure is mounted for use in cooperation with the base.

28 Claims, 5 Drawing Sheets

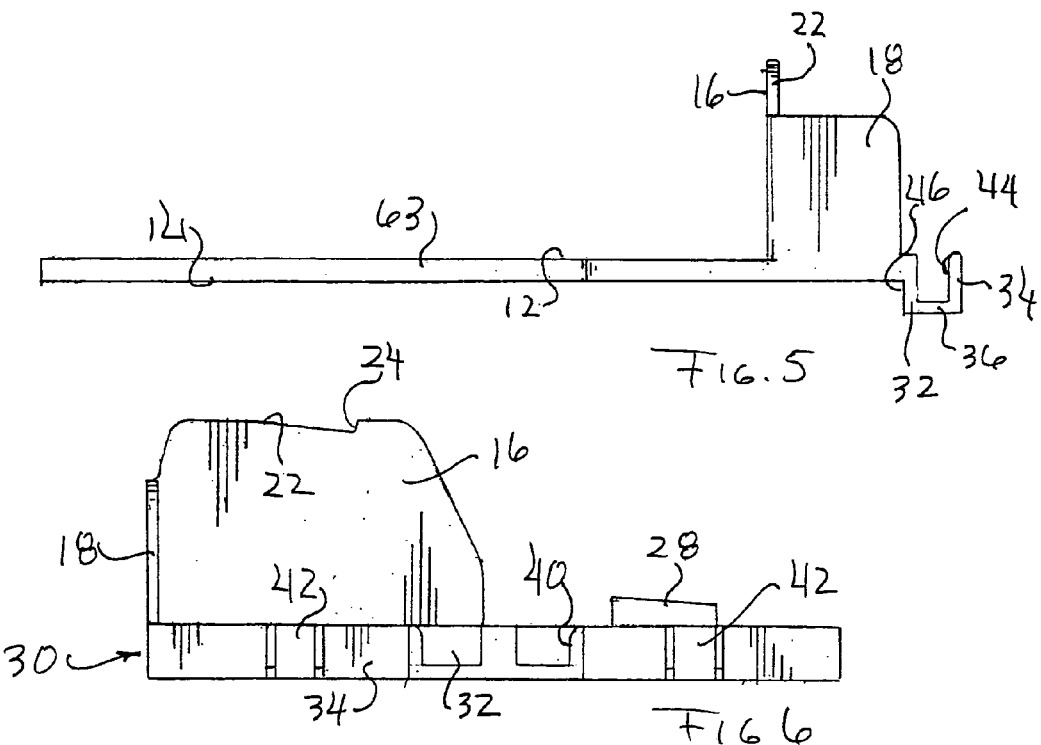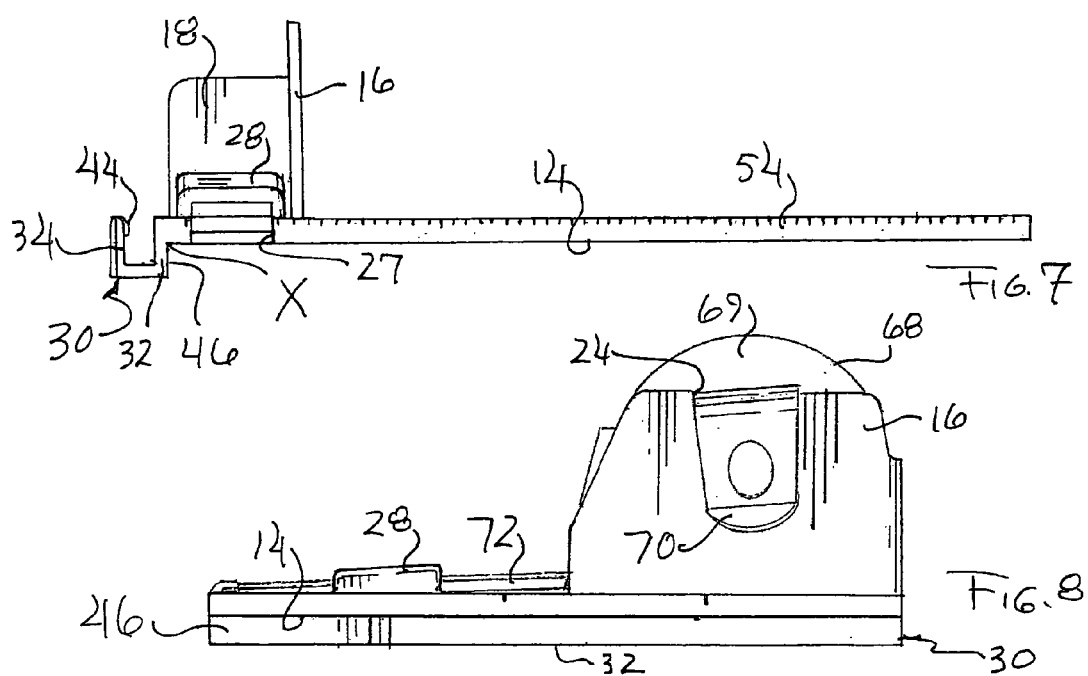

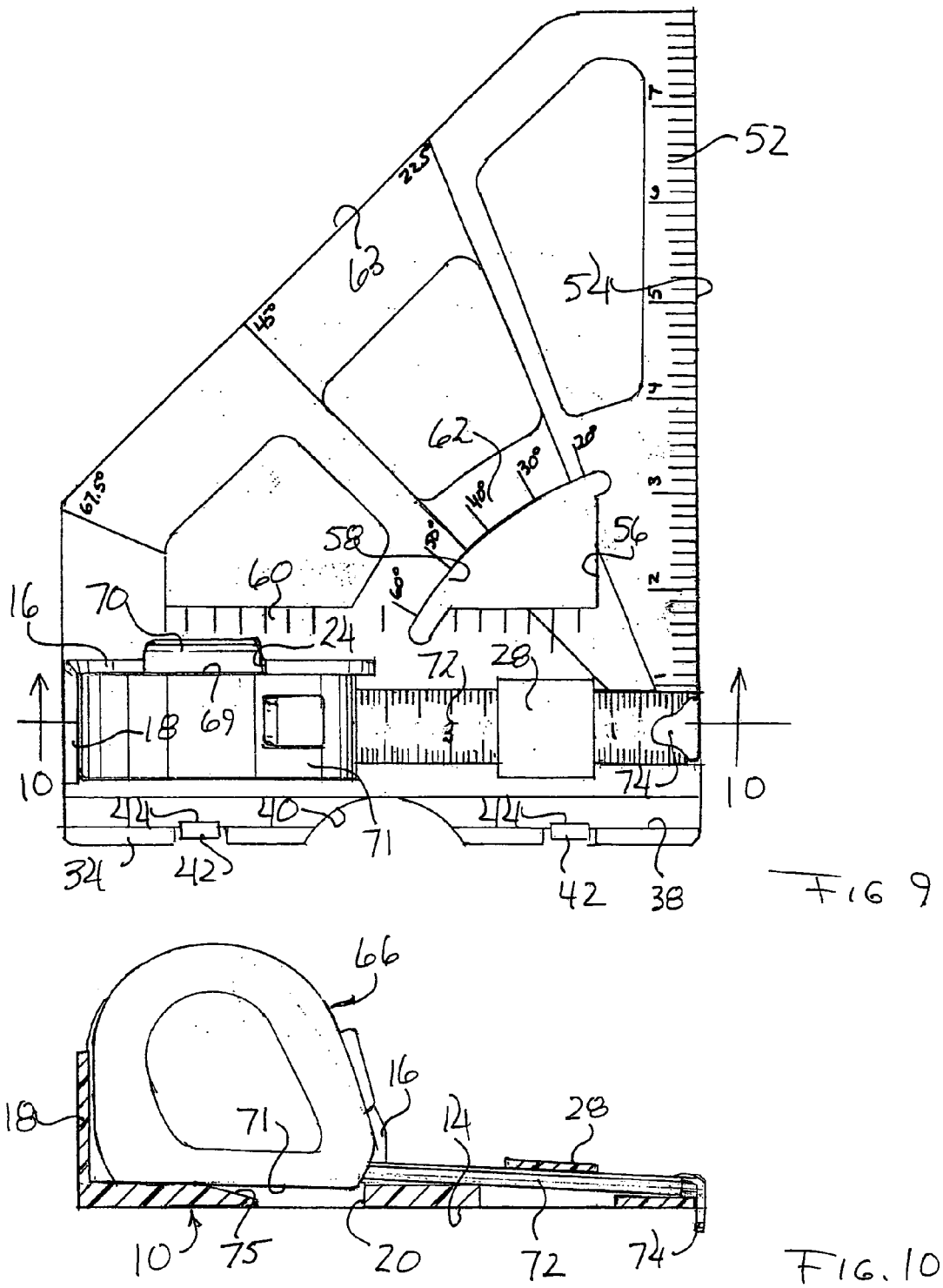

LAY-OUT TOOL AND ASSEMBLY

BACKGROUND OF THE INVENTION

A wide variety of squares, measuring rules, marking guides and the like have long been available for use in laying out, measuring, marking and cutting of workpieces. It is of course highly desirable that all implements necessary for carrying out a given procedure be readily available to the worker and in good operating condition; often, however, that is not the case. For example, either a tape measure or a sharp pencil may not be at hand when a mark or a line is to be drawn, at a measured angle or distance, utilizing a traditional square.

BRIEF SUMMARY OF THE INVENTION

Accordingly, it is the broad object of the present invention to provide a novel lay-out assembly comprised of a plurality of normally separate components, and to provide a novel lay-out tool that is constructed to enable such assemblage.

A more specific object of the invention is to provide a novel lay-out tool that has pencil mounting and sharpening features.

Another more specific object of the invention is to provide such a lay-out tool that has means thereon for mounting a tape measure in operative position to cooperate with the tool for measuring and marking distances.

It has now been found that certain of the foregoing and related objects of the invention are attained by the provision of a lay-out tool comprised of a base having a top side and a bottom side, at least one rectilinear edge portion, and means on the top side of the base for mounting a tape measure. The mounted tape measure is disposed in such position that its extended blade traverses the rectilinear edge portion of the base, to enable measurement of distances therebeyond.

Generally, the means for mounting will be constructed for disengageable mounting of a separate tape measure, and will usually take the form of a wall that is upstanding from the general plane of the base and that is disposed substantially in a plane lying perpendicular to both the general plane and also to the rectilinear edge portion of the base. The mounting wall will usually have an upper marginal portion that is configured to engage a clip attached to the case of the tape measure, which marginal portion will advantageously be indented to engage the clip so as to prevent inadvertent displacement in the direction of the rectilinear edge portion.

In most instances the base of the tool will have indicia, formed on or applied to its top side, defining a distance scale that extends along the rectilinear edge portion, which portion provides a straight edge. A channel or slot, dimensioned and configured for the constrained passage of the blade of a tape measure, will desirably lead at least substantially to the rectilinear edge portion of the base; preferably, the slot will traverse the edge portion.

In addition, or alternatively, the base will include depending structure that defines a rectilinear abutment surface lying in a plane perpendicular to the rectilinear edge portion, and adjacent one end thereof. The depending structure will preferably be integrally formed on the base, as a single piece therewith, and will normally extend below the plane of the underlying base-supporting surface; in most instances the plane of the abutment surface will be perpendicular to the plane of the underlying surface.

The base will usually be provided with radial indicia on its top side, comprising at least one angle scale. The abutment surface and the "one" end of the rectilinear edge portion will normally intersect, such that the intersection provides both a center point reference for the radial indicia and also a zero reference point for the distance scale. The base may advantageously be formed with an opening that is defined, in part, by an arcuate edge portion proximate to which at lease some of the radial indicia extend.

Certain objects of the invention are attained by the provision of a lay-out tool assembly comprising a base, as herein described, and a tape measure mounted on the base. The tape measure will usually include a case comprised of opposite sidewall portions and a surrounding peripheral wall portion, the later being formed with an aperture for passage of the rule blade. Such a tape measure will usually be mounted disengageably on the base, disposed on its peripheral wall portion and in an upright position.

Other objects of the invention are attained by the provision of a lay-out tool comprised of a base, as herein described, means for securing a pencil on the base, and means on the base providing an abrasive area on the base dimensioned and configured for ready access to, and effective abrasion of, a pencil end portion. In such embodiments the base will desirably include depending structure formed of a plurality of walls and defining an upwardly open, elongate channel, dimensioned and configured for receiving and securely seating a pencil.

In the most preferred embodiment the lay-out tool of the invention will include a base; means on the top side of the base for mounting a tape measure; means for securing a pencil on the base; and means providing an abrasive area to enable for sharpening of the pencil, all as herein described.

BRIEF DESCRIPTION OF THE SEVERAL VIEWS OF THE DRAWINGS

FIG. 5 is a rear end elevational view of the square component;

FIG. 6 is a side-elevational view of the square component;

FIG. 7 is a front end elevational view of the square component;

FIG. 8 is an elevational view of the assembly depicted in FIG. 1, taken from the side opposite to that of FIG. 6;

FIG. 9 is a plan view of a tool assembly embodying the invention;

FIG. 10 is a sectional view of the tool assembly of FIG. 9, taken along line 10—10 therein;

DETAILED DESCRIPTION OF THE INVENTION

Figure 1:
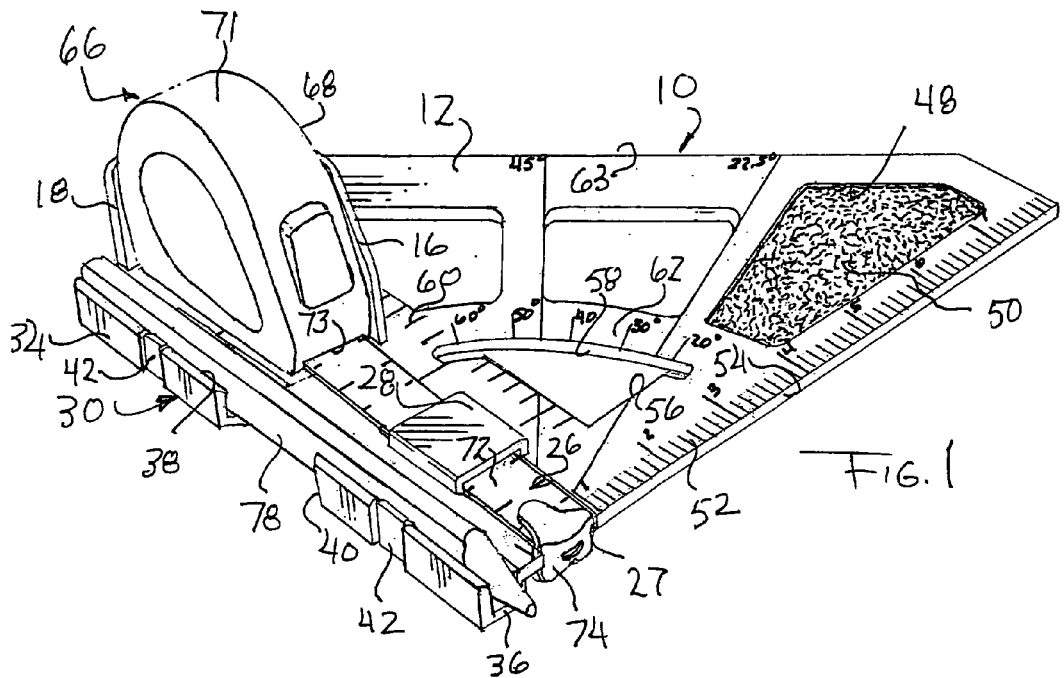
FIG. 1 of the drawings is a perspective view of a lay-out tool assembly embodying the present invention.
Figure 2:
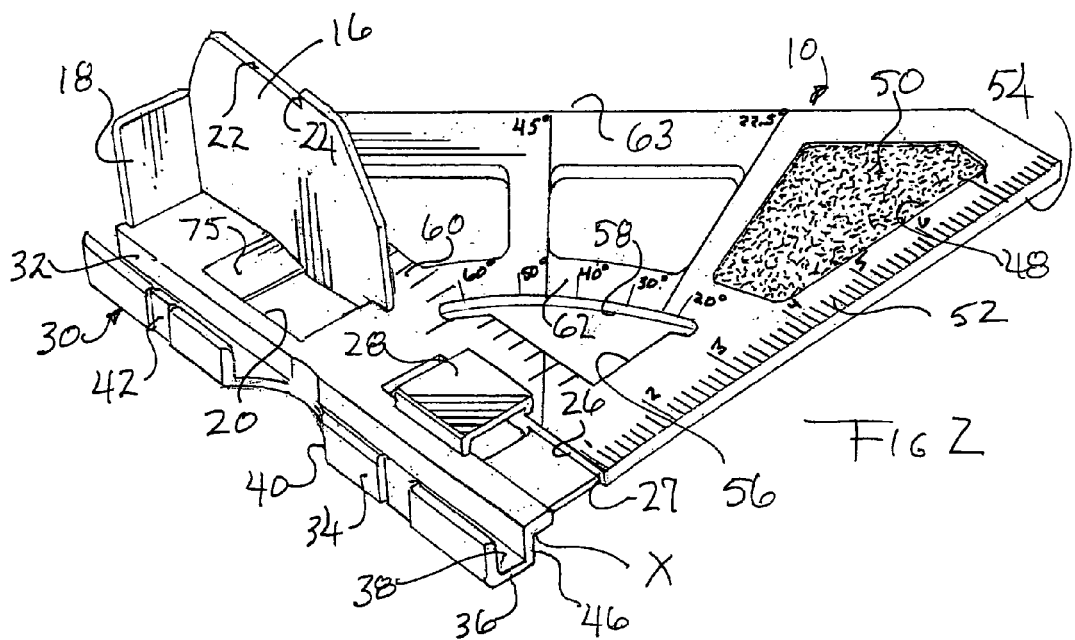
FIG. 2 is a perspective view of the square component of the assembly illustrated in FIG. 1.
Figure 3:
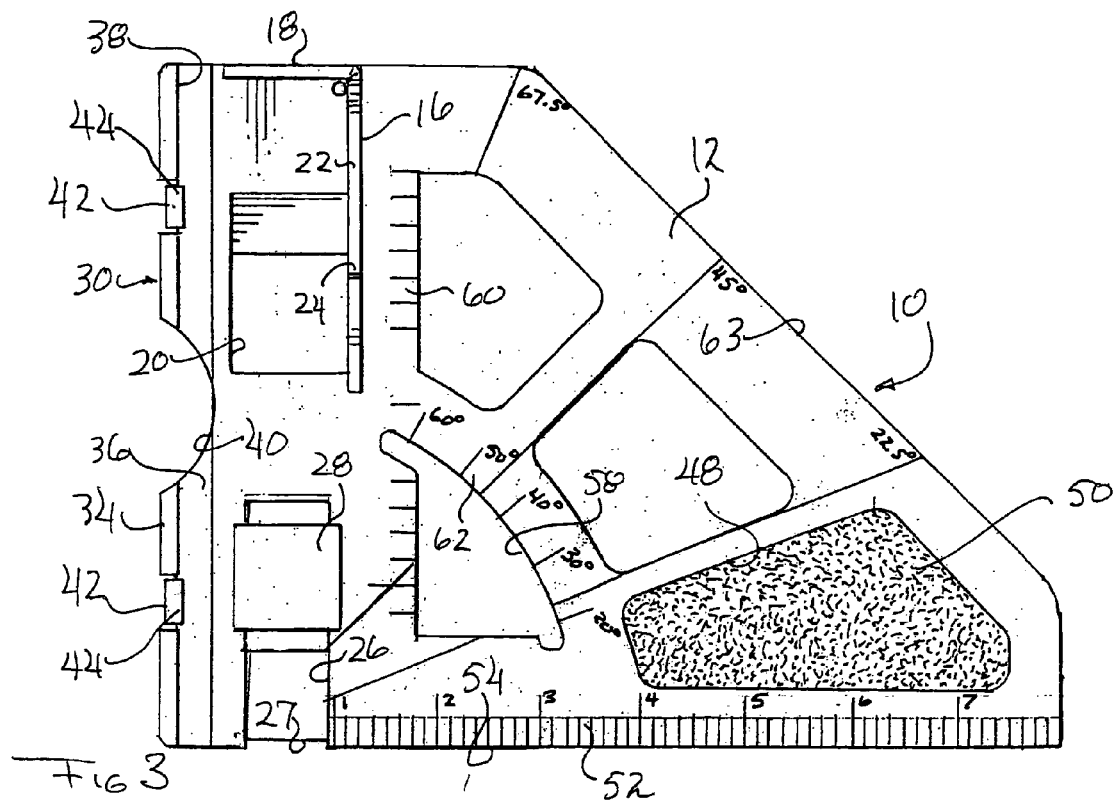
FIG. 3 is a plan view of the square component.
Figure 4:
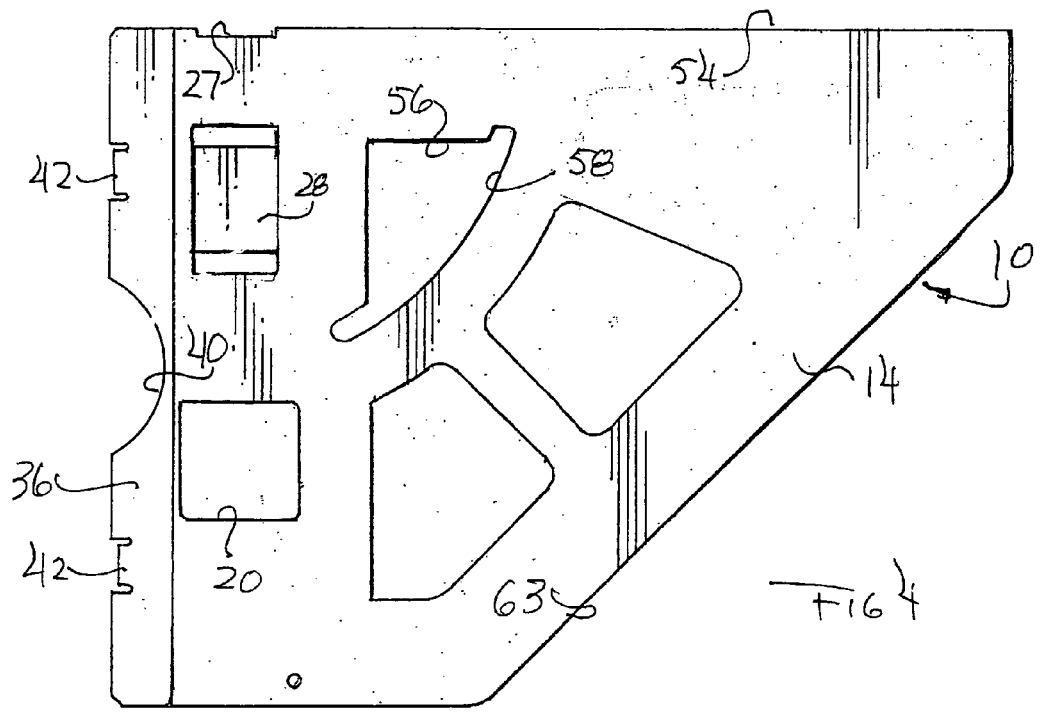
FIG. 4 is a bottom view of the square component.

Turning now in detail to the appended drawings, FIG. 1 depicts a lay-out tool assembly embodying the invention and including a one-piece base of molded synthetic resinous material, generally designated by the numeral 10, a tape measure generally designated by the numeral 66, and a carpenter's pencil 78. The base 10 is of generally planar and generally triangular construction, and has a top face 12 and a bottom face 14. Upstanding lateral and back walls 16, 18, respectively, are integrally formed on the top face 12 of the base, and intersect at a corner. As can be seen from FIG. 2 (and other figures), the lateral wall 16 has an indentation 22 formed in its marginal upper portion, providing a shoulder 24, and an opening 20 extends through the base 10 adjacent the lower end of the wall 16. A shallow slot 26 is formed in the base 10 in alignment with the wall structure 16, 18, and forwardly thereof, and is partially enclosed by an overlying inverted U-shaped cap element 28. A shallow depression 48 is formed into the top face 12 of the base 10, within which is provided an element 50 (such as of stair-tread covering, or like material) having a surface of coarse, abrasive material.

With additional reference now to FIGS. 3–10 of the drawings, it is seen that structure extending along one side of the base 10 provides an integral trough, generally designated by the numeral 30, which is comprised of an inner wall 32, an outer wall 34, and a bottom wall 36, cooperatively defining an elongate channel 38. A semi-circular indent 40, formed through the outer and bottom walls 34, 36 of the trough 30, provides lateral access into the channel 38, and two resilient tab elements 42 are formed into the walls 34 and 36, each tab element 42 having a small, inwardly directed lip element 44 along its free upper edge. The exterior surface 46 of the inner wall 32 of the trough 30 forms a right angle with the bottom face 14 of the base 10.

The forward marginal portion 52 of the base terminates in a straight edge 54 extending therealong, which portion 52 is marked with indicia to provide a distance scale. The slot 26 traverses the marginal portion 52, and terminates at an indentation 27 formed inwardly from the straight edge 54.

An opening through the base 10 is defined by right-angle and arcuate edge portions 56 and 58, respectively. A second distance scale is provided by indicia extending along the marginal portion 60, and an angle scale is provided by indicia on the arcuate marginal portion 62, certain of which indicia extend to the straight rear edge 63. The edge 63 is disposed at a 45° angle to both the straight edge 54 and also the abutment surface 46, which edge 54 and surface 46 are perpendicular to one another and intersect at point "X". The intersection X serves both as the zero reference point for the distance scale on the marginal portion 52 and also as the center point for the radial markings on the arcuate portion 62.

The tape measure 66 is of conventional construction, and includes a case 68 to one wall 69 of which is attached a belt clip 70. As can best be seen from FIGS. 1 and 8–10, the tape measure 66 is seated with the peripheral wall 71 of the case 68 resting upon top face 12 of the base 10 (to which the blade aperture 73 lies proximate), within the space defined by the upstanding walls 16, 18, and with the belt clip 70 engaged upon the upper marginal portion of the lateral wall 16. The edge of the clip abuts against the shoulder 24, and the hole 20 in the base 10 (and the adjacent inclined surface 75) permits the case 68 to tilt slightly downwardly, in the forward direction.

After exiting through the peripheral wall aperture 73, the blade 72 of the tape measure 66 passes through the slot 26 in the base 10 and under the cap 28, and is guided thereby, with a slight declination (see FIG. 10), across the forward marginal portion 52 of the base. The engagement hook 74 on the end of the blade 72, retracted as depicted, is accommodated within the indentation 27 in the marginal portion 52.

As seen in FIG. 1, the carpenter's pencil 78 is normally seated in the upwardly opening channel 38 of the trough 30. It is securely retained therein by engagement under the lip elements 44 on the free end portions of the resilient tabs 42, and can readily be removed by upward finger pressure applied through the indent 40. Needless to say, the abrasive material 50, present within the depression 48, provides a conveniently located and readily accessible means for sharpening the pencil in the event the lead breaks or its point becomes dull.

Figure 11:
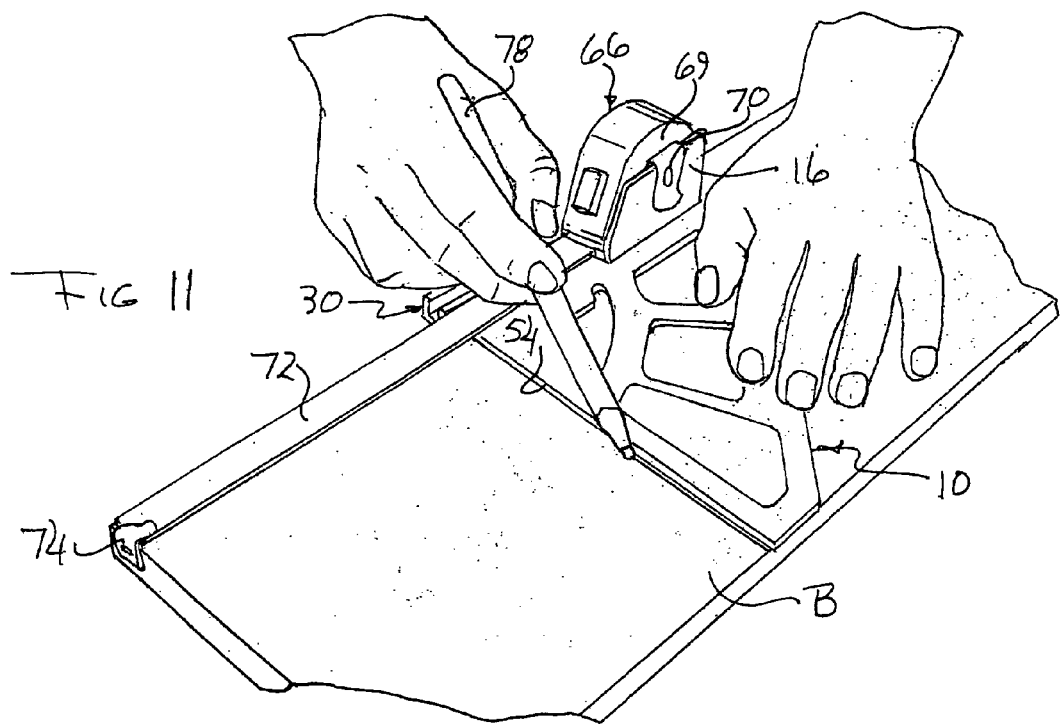
FIG. 11 is a perspective view showing a lay-out tool assembly embodying the invention, utilized for marking a line at a measured distance on a workpiece.

FIG. 11 depicts the lay-out tool assembly of the invention in use for measuring and marking a distance on board "B". Thus, with the bottom face 14 of the base 10 lying on the top surface of the board, and with the exterior surface 46 of the inner wall 32 of the trough structure 30 abutted against a side edge 54 of the board, the straight edge 54 serves as a marking guide for drawing a perpendicular line. With the hook 74 on the end of the blade 72 fastened over the forward edge of the board, the distance from the edge at which the line is to be drawn is readily and accurately established by reference to the scale on the tape measure blade 72.

Figure 12:
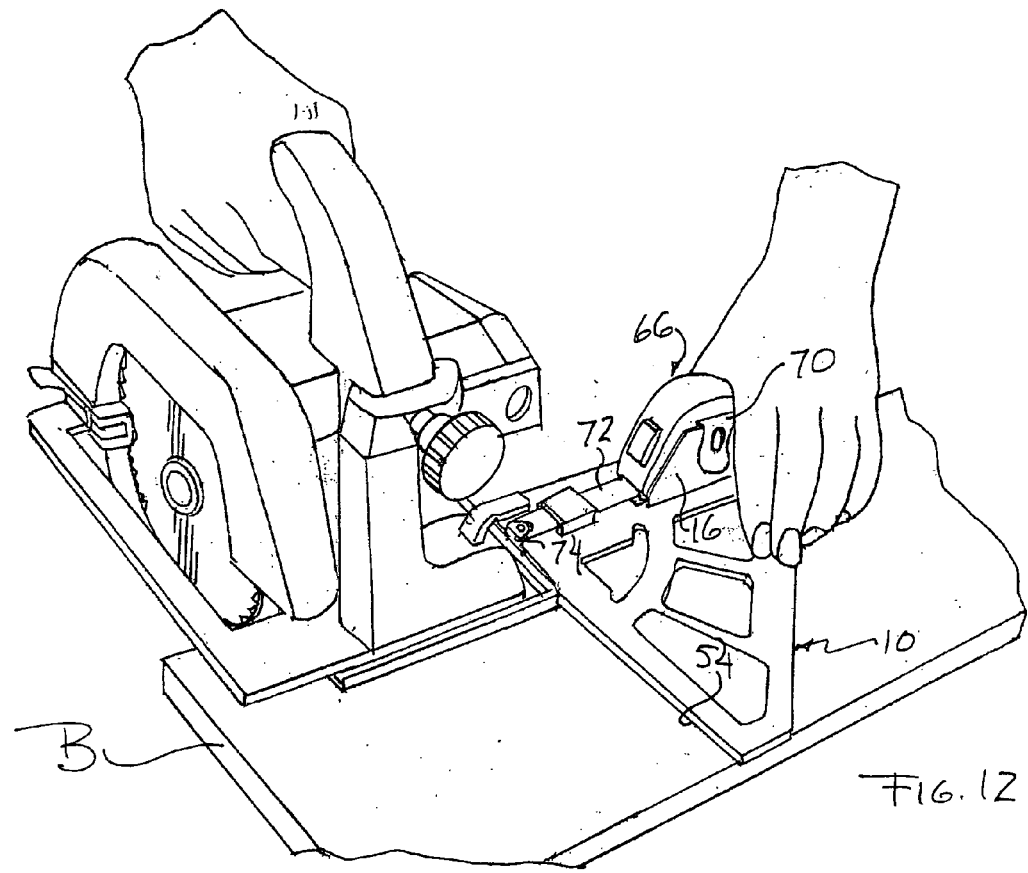
FIG. 12 is a perspective view showing the tool assembly used as a cutting guide for a portable circular power saw.

Finally, with reference to FIG. 12, it is seen that the tool of the invention provides a convenient cutting guide for a portable circular saw. Again, the base component 10 is simply positioned upon the top surface of the board with the depending inside wall surface 46 abutted against its side edge, so as to enable a square cut to be made across the board utilizing the straight edge 54 at the front of the square as a cutting guide. To do so, it is necessary only that the blade 72 of the tape measure be retracted sufficiently to cause the end hook 74 to lie within the indentation 27 and out of the path of the saw blade. It will be appreciated that the rear edge 63 on the base 10 can readily be used as a guide for marking and cutting at 45° angles.

Thus, it can be seen that the present invention provides a novel lay-out assembly comprised of a plurality of normally separate components, and a novel lay-out tool that is constructed to enable such assemblage. The lay-out tool may have pencil mounting and sharpening features, and/or it may have means thereon for mounting a tape rule in operative position for cooperative measuring and marking.

Having thus described the invention, what is claimed is:

1. A lay-out tool comprised of a generally planar base having a top side and a bottom side, at least one rectilinear edge portion, and a wall on said top side of said base, upstanding from the general plane thereof, for disengageably mounting a tape measure in such position that the blade of the tape measure, when extended, traverses said rectilinear edge portion to enable measurement of distances therebeyond, said upstanding wall being disposed substantially in a plane lying perpendicular to both said general plane and also said rectilinear edge portion of said base and having an upper marginal portion that is indented to engage the clip of a mounted tape measure against forward displacement in the direction of said rectilinear edge portion, said base also having an inclined surface disposed to provide underlying support for the case of a tape measure so mounted and serving to tilt the case slightly downwardly in the forward direction.

2. The tool of claim 1 wherein said base includes depending structure defining an abutment surface lying in a plane perpendicular to said rectilinear edge portion, and adjacent one end thereof.

3. The tool of claim 2 wherein said bottom side of said base provides an underlying support surface in a plane to which said plane of said abutment surface is perpendicular, said depending structure extending below said underlying support surface.

4. The tool of claim 3 wherein said abutment surface and said one end of said rectilinear edge portion intersect, and provide a measurement reference point.

5. A lay-out tool assembly comprising: a generally planar base having a top side and a bottom side, and at least first and second rectilinear edge portions disposed perpendicular to one another; means on said top side of said base for mounting a tape measure in such position that the blade of the tape measure, when extended, extends along said first rectilinear edge portion and traverses said second rectilinear edge portion to enable measurement of distances therebeyond; means for securing a pencil on said base to extend along said first rectilinear edge portion and parallel to the plane of said base; and means for providing a flat abrasive area on said top side of said base dimensioned and configured for ready access to, and effective abrasion of, a pencil end portion; and a tape measure mounted on said base by said mounting means.

6. The tool assembly of claim 5 wherein said tape measure is disengageably mounted on said base.

7. The tool assembly of claim 6 wherein said tape measure includes a case comprised of opposite sidewall portions and a surrounding peripheral wall portion having an aperture therein for passage of the rule blade therethrough, said tape measure being mounted on said base in an upright position and disposed on said peripheral wall portion with said aperture proximate said top side of said base.

8. The tool of claim 5 wherein said means for mounting is constructed for disengageable mounting of said tape measure, and wherein said base has structure thereon defining an elongate channel dimensioned and configured for receiving and securely seating a pencil therein and providing said means for securing a pencil.

9. The tool of claim 8 wherein said means for mounting comprises a wall upstanding from the general plane of said base, and wherein said channel-defining structure comprises depending structure on said base defining an abutment surface lying in a plane adjacent one end of said second rectilinear edge portion, said upstanding wall and said depending structure being integrally formed with said base as a single piece.

10. The tool of claim 9 wherein said bottom side of said base provides an underlying support surface in a plane to which said plane of said abutment surface is perpendicular, said depending structure extending below said underlying support surface.

11. The tool of claim 9 wherein said depending structure is comprised of a plurality of walls and is upwardly open.

12. The tool assembly of claim 5 additionally including an elongate, flat carpenter's pencil received and securely seated in said means for securing a pencil.

13. A lay-out tool comprised of a generally planar base having a top side and a bottom side, and at least first and second rectilinear edge portions disposed perpendicular to one another; means on said top side of said base for mounting a tape measure in such position that the blade of the tape measure, when extended, extends along said first rectilinear edge portion and traverses said second rectilinear edge portion to enable measurement of distances therebeyond; means for securing a pencil on said base to extend along said first rectilinear edge portion and parallel to the plane of said base; and means for providing a flat abrasive area on said top side of said base dimensioned and configured for ready access to, and effective abrasion of, a pencil end portion.

14. The tool of claim 13 wherein said means for mounting is constructed for disengageable mounting of a separate tape measure.

15. The tool of claim 13 wherein said means for mounting comprises a wall up-standing from the general plane of said base.

16. The tool of claim 15 wherein said upstanding wall is disposed substantially in a plane lying perpendicular to both said general plane and also said second rectilinear edge portion of said base.

17. The tool of claim 16 wherein said upstanding wall has an upper marginal portion that is configured to engage a clip attached to the case of a tape measure.

18. The tool of claim 17 wherein said upper marginal portion of said upstanding wall is indented to engage the clip of a mounted tape measure against displacement in the direction of said rectilinear edge portion.

19. The tool of claim 13 wherein said base has indicia on said top side thereof defining at least one distance scale thereon, extending along said second rectilinear edge portion thereof.

20. The tool of claim 13 wherein said base has radial indicia on said top side thereof comprising at least one angle scale.

21. The tool of claim 20 wherein said base has an opening therethrough defined in part by an arcuate edge portion proximate to which at least certain of said radial indicia extend.

22. The tool of claim 13 wherein said base is constructed to define a channel, for the constrained passage of the blade of a tape measure, leading at least substantially to said rectilinear edge portion.

23. The tool of claim 22 wherein said channel traverses said rectilinear edge portion.

24. The tool of claim 13 wherein said second rectilinear edge portion provides a straight edge, and wherein said base has indicia on said top side thereof defining at least one distance scale thereon, extending along said second rectilinear edge portion thereof.

25. The tool of claim 13 wherein said base includes depending structure defining an abutment surface lying in a plane perpendicular to said rectilinear edge portion and adjacent one end thereof, and wherein said bottom side of said base provides an underlying support surface in a plane to which said plane of said abutment surface is perpendicular, said depending structure extending below said underlying support surface.

26. The tool of claim 25 wherein said depending structure is integrally formed with said base as a single piece, and defines an elongate channel dimensioned and configured for receiving and securely seating a pencil therein and providing said means for securing a pencil.

27. The tool of claim 26 wherein said depending structure is comprised of a plurality of walls, is upwardly open, and is formed with a lateral opening therealong to provide access to said channel through at least one of said walls.

28. A lay-out tool comprised of a generally planar base having a top side and a bottom side, and at least one rectilinear edge portion; means on said top side of said base for mounting a tape measure in such position that the blade of the tape measure, when extended, traverses said rectilinear edge portion to enable measurement of distances therebeyond, said means for mounting being constructed for disengageable mounting of a separate tape measure and comprising a generally planar wall upstanding from the general plane of said base; said base having structure thereon defining an elongate channel dimensioned and configured for receiving and securely seating a pencil therein and providing means for securing a pencil on said base, said channel-defining structure comprising depending structure on said base defining an abutment surface extending parallel to said generally planar upstanding wall and lying in a plane perpendicular to said rectilinear edge portion and adjacent one end thereof, and wherein said bottom side of said base provides an underlying support surface in a plane to which said plane of said abutment surface is perpendicular, said depending structure extending below said underlying support surface.

* * * * *